(12) United States Patent
Agarwal et al.

(10) Patent No.: US 11,716,700 B2
(45) Date of Patent: Aug. 1, 2023

(54) FALSE BASE STATION DETECTION BASED ON TIME OF ARRIVAL OR TIMING ADVANCE

(71) Applicant: QUALCOMM Incorporated, San Diego, CA (US)

(72) Inventors: Ravi Agarwal, San Diego, CA (US); Gavin Bernard Horn, La Jolla, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/975,156

(22) Filed: Oct. 27, 2022

(65) Prior Publication Data
US 2023/0057143 A1  Feb. 23, 2023

Related U.S. Application Data

(62) Division of application No. 17/086,257, filed on Oct. 30, 2020, now Pat. No. 11,516,765.

(60) Provisional application No. 62/935,513, filed on Nov. 14, 2019.

(51) Int. Cl.
*H04W 64/00* (2009.01)
*H04W 74/08* (2009.01)
*G01S 5/02* (2010.01)
*H04L 5/00* (2006.01)
*H04W 12/122* (2021.01)

(52) U.S. Cl.
CPC ....... *H04W 64/003* (2013.01); *G01S 5/02216* (2020.05); *H04L 5/0048* (2013.01); *H04W 12/122* (2021.01); *H04W 74/0833* (2013.01)

(58) Field of Classification Search
CPC ............. H04W 64/003; H04W 12/122; H04W 74/0833; H04W 4/023; H04W 4/06; H04W 36/08; H04W 56/0045; H04W 74/0891; G01S 5/02216; H04L 5/0048; H04L 5/0007; H04L 5/0078
See application file for complete search history.

(56) References Cited

U.S. PATENT DOCUMENTS

| | | | |
|---|---|---|---|
| 6,370,373 B1 | 4/2002 | Gerth et al. | |
| 10,129,283 B1 * | 11/2018 | Briggs | H04W 12/126 |
| 11,516,765 B2 | 11/2022 | Agarwal et al. | |
| 2008/0250498 A1 * | 10/2008 | Butti | H04W 12/122 726/23 |
| 2013/0344844 A1 * | 12/2013 | Goldfarb | H04W 12/128 455/411 |
| 2016/0381545 A1 | 12/2016 | Wang et al. | |
| 2021/0044979 A1 * | 2/2021 | Vivanco | H04W 48/02 |
| 2021/0297976 A1 * | 9/2021 | Medina Acosta | H04W 56/003 |

\* cited by examiner

*Primary Examiner* — Michael Y Mapa
(74) *Attorney, Agent, or Firm* — Qualcomm Incorporated

(57) ABSTRACT

A base station determines a window of time for arrival of uplink signals, wherein the window of time includes a start based on a first expected time of arrival for a first uplink signal from a first UE and an end based on a second expected time of arrival for a second uplink signal from a second UE. The base station detection detects a false base station, such as a L1 man-in-the-middle false base station, based on an uplink signal being received outside of the determined window of time for the arrival of uplink signals.

15 Claims, 14 Drawing Sheets

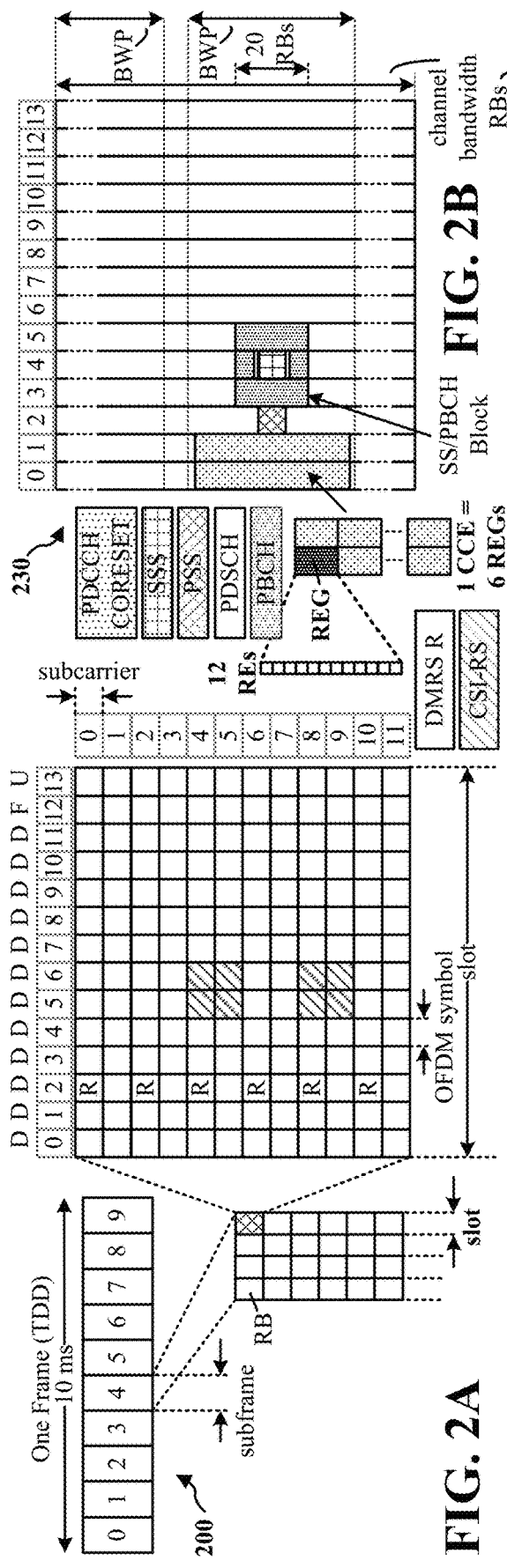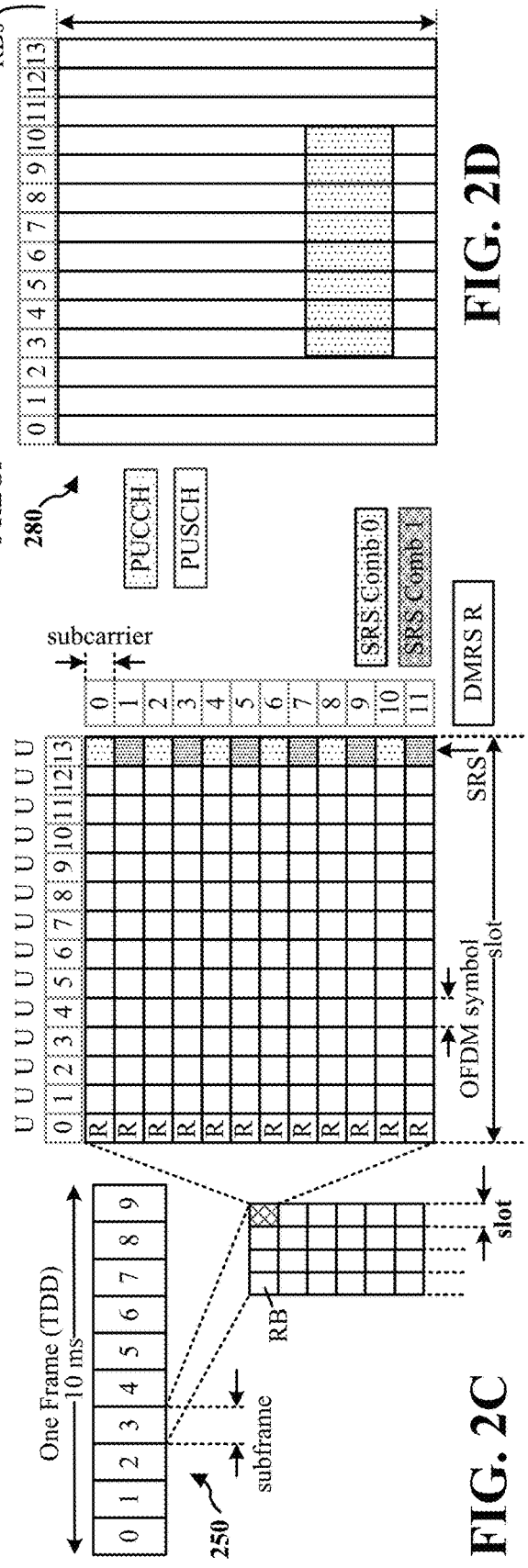
FIG. 2A  FIG. 2B  FIG. 2C  FIG. 2D

FALSE BASE STATION DETECTION BASED ON TIME OF ARRIVAL OR TIMING ADVANCE

CROSS REFERENCE TO RELATED APPLICATIONS

This application is a divisional of U.S. application Ser. No. 17/086,257, filed on Oct. 30, 2020, and entitled "False Base Station Detection Based on Time of Arrival or Timing Advance" and claims the benefit of U.S. Provisional Application Ser. No. 62/935,513, entitled "False Base Station Detection Based on Time of Arrival or Timing Advance" and filed on Nov. 14, 2019, the disclosure of which is incorporated herein by reference.

BACKGROUND

Technical Field

The present disclosure relates generally to communication systems, and more particularly, to detection of a false base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In a wireless access network, a false base station (FBS) may imitate a legitimate base station by repeating the transmissions of the legitimate base station at a higher power level such that one or more user equipment (UEs) synchronize with the FBS instead of the legitimate base station. The FBS may then act as a man-in-the-middle and launch various attacks such as a denial of service attack. In particular, the FBS may decode physical layer transmissions to determine whether to drop the transmission to the UE. Accordingly, the FBS may deny services to the UE.

The present disclosure provides various ways for a base station or a UE to detect an FBS. For example, a base station may determine a window of time during which the base station expects that uplink signals will be received. The window may include a start time based on uplink signals from a UE that is close to the base station and an end time based on uplink signals from a UE that is at or near the cell edge. The base station may detect the presence of an FBS when uplink signals are detected outside of the window. As the FBS decodes the physical layer downlink signal, e.g., in order to determine whether to drop the signal, the delay of the repeated signal may be greater than would be expected due to propagation and/or a legitimate repeater. As the timing of the uplink signal from the UE is based on the delayed timing of the downlink signal from the FBS, the base station may determine that uplink signals that arrive outside the expected window of time indicate presence of an FBS. A UE may detect an FBS based on a timing advance received from a base station for uplink communication. The UE may detect the FBS if the timing advance exceeds a threshold timing advance value. A timing advance that is greater than the threshold may be due to a delay caused by an FBS that decodes the physical layer uplink signal before sending uplink transmissions to the base station. A timing advance that is greater than the threshold may be due to a delay caused by an FBS that decodes the physical layer downlink signal before sending downlink transmissions to the UE. The delay in receiving the downlink signal causes a corresponding delay in the UE sending an uplink signal. The UE may receive the threshold timing advance value from the base station. The base station and/or the UE may perform a mitigation operation in response to determining the existence of the FBS.

In an aspect of the disclosure, a method, a computer-readable medium, and an apparatus are provided for wireless communication at a base station. The apparatus determines a window of time for arrival of uplink signals, wherein the window of time includes a start based on a first expected time of arrival for a first uplink signal from a first UE and an end based on a second expected time of arrival for a second uplink signal from a second UE. The apparatus receives an uplink signal and detects an FBS based on the uplink signal being received outside of the window of time for the arrival of uplink signals.

In another aspect of the disclosure, a method, a computer-readable medium, and an apparatus are provided for wireless communication at a base station. The apparatus determines a timing advance based on a cell radius of the base station and determines a timing advance threshold associated with detection of an FBS by the UE, the timing advance threshold being longer than the timing advance based on the cell radius of the base station. The apparatus transmits the timing advance threshold to the UE for the detection of the FBS by the UE.

In another aspect of the disclosure, a method, a computer-readable medium, and an apparatus are provided for wireless communication at a UE. The apparatus receives an indication of a timing advance for uplink communication from a base station and detects and FBS based on the timing advance received from the base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
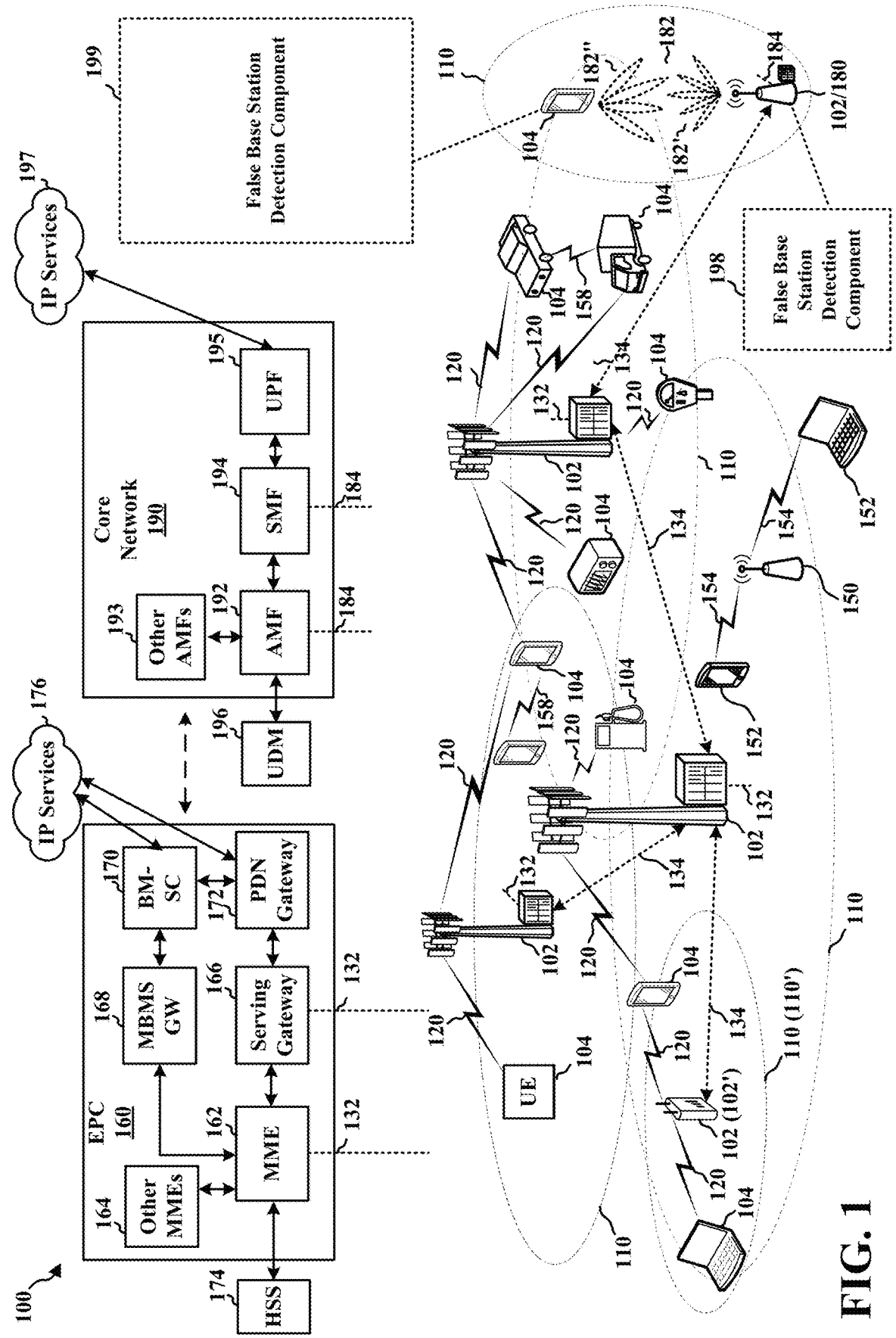
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in some aspects, the base station 102/180 may include a false base station detection component 198 configured to detect a man-in-the-middle L1 false base station. In some aspects, the false base station detection component may be configured to determine a window of time for arrival of uplink signals, wherein the window of time includes a start based on a first expected time of arrival for a first uplink signal from a first UE (e.g., a UE 104 that is close to the base station 102/180) and an end based on a second expected time of arrival for a second uplink signal from a second UE (e.g., a UE 104 that is distant from the base station 102/180). The false base station detection component 198 may be configured to detect a false base station based on an uplink signal being received outside of the determined window of time for the arrival of uplink signals. In some aspects, the false base station detection component 198 may be configured to determine a timing advance threshold associated with detection of a false base station by a UE 104, and the base station 102/180 may transmit the timing advance threshold to the UE 104 for the detection of the FBS by the UE. In some aspects, the UE 104 may include a false base station detection component 199 configured to detect a false base station based on a timing advance received from the base station 102/180, such as if the timing advance is greater than a timing advance threshold. The timing advance threshold may be received from the base station 102/180. In response to detecting the false base station, the UE 104 may report the detected false base station or may perform another mitigation operation. In response to detecting the false base station and/or receiving a report of a false base station from the UE 104, the base station 102/180 may be configured to perform a mitigation operation such as handing the UE 104 over to another cell or updating communication parameter(s) for cell selection/cell reselection in order to de-prioritize a cell corresponding to the false base station. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
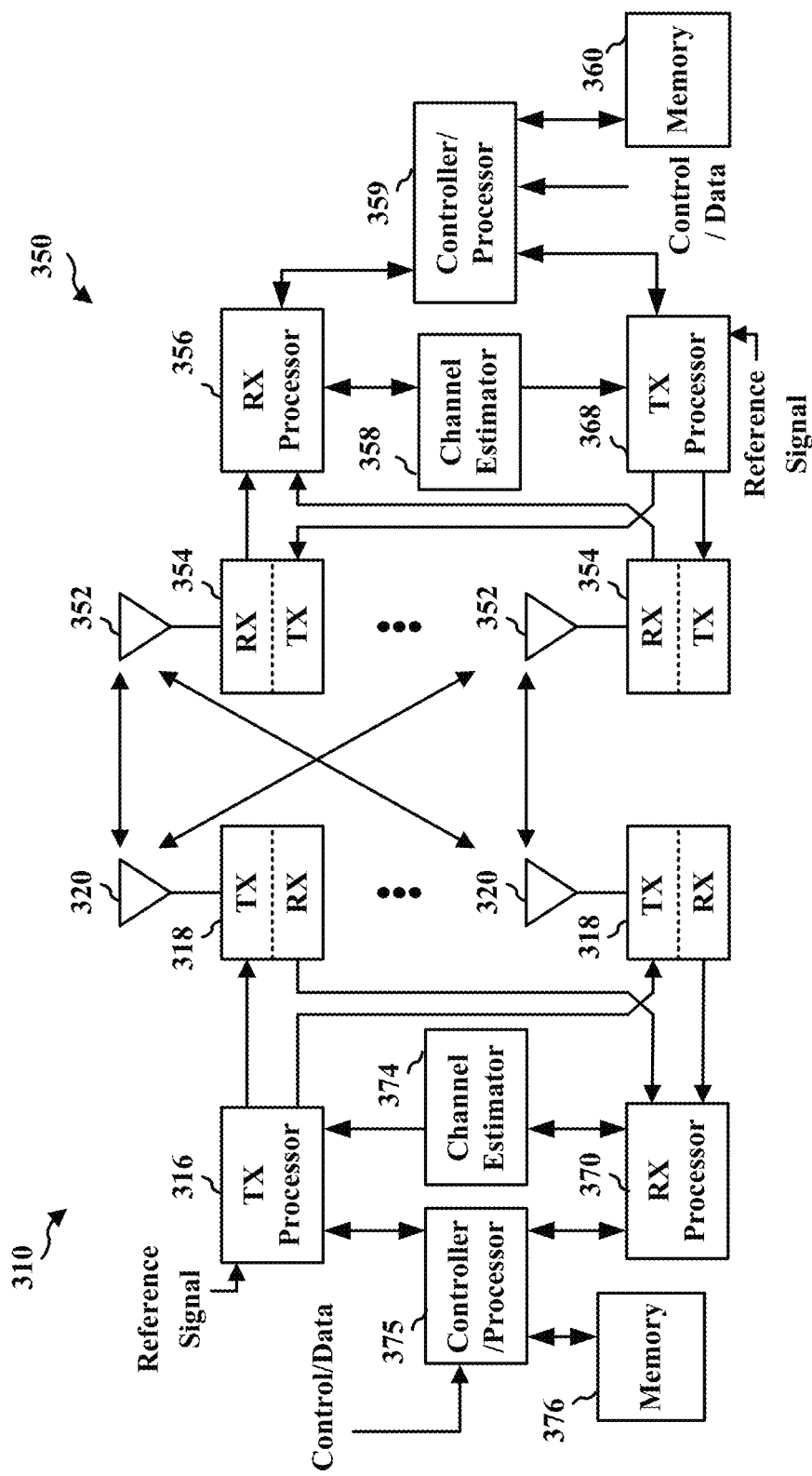
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the false base station detection component 199 of FIG. 1. At least one of the TX processor 316, the RX processor 370, and the controller/processor 375 may be configured to perform aspects in connection with the false base station detection component 198 of FIG. 1.

Figure 4:
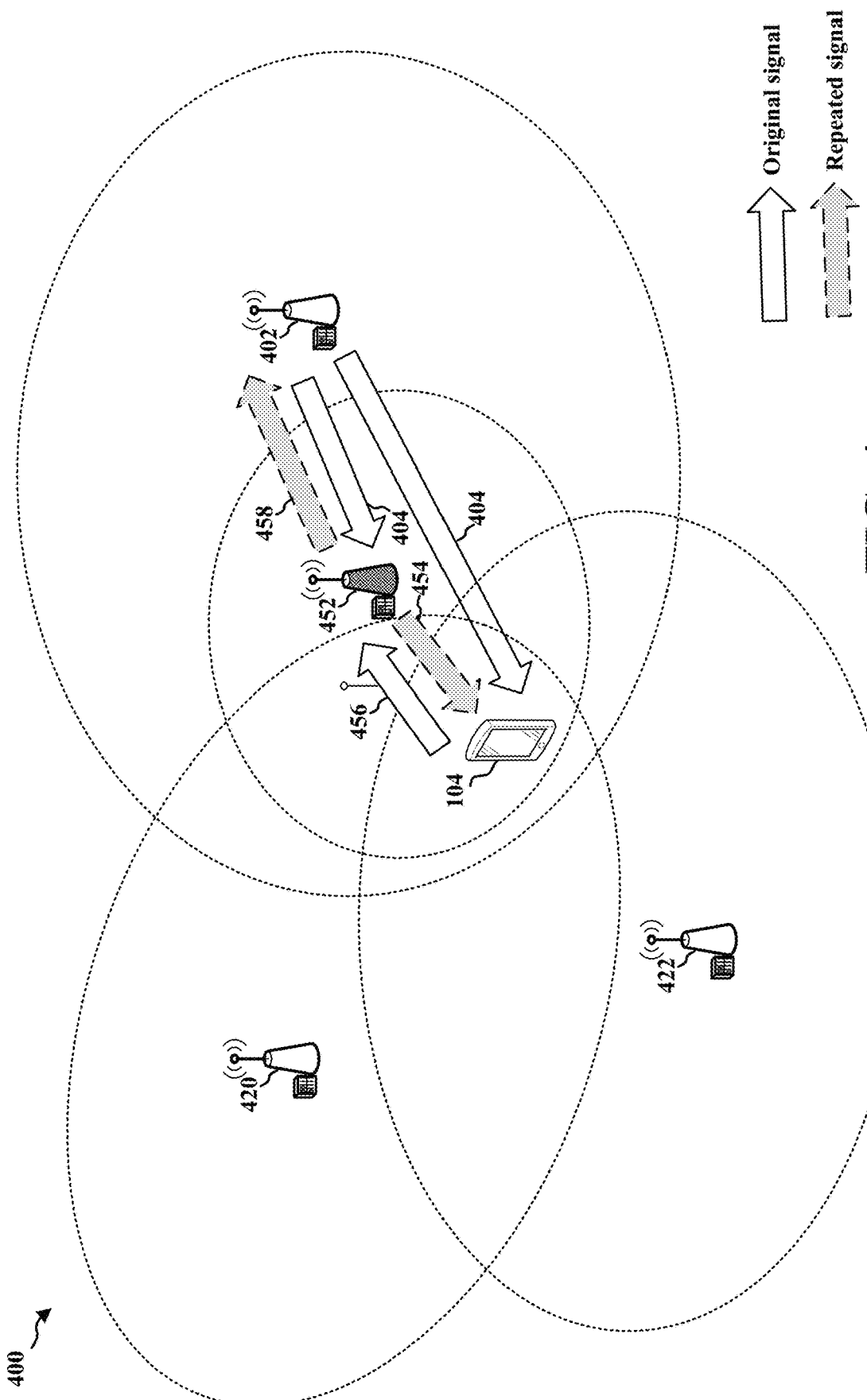
FIG. 4 is a diagram showing an example of a man-in-the-middle false base station.

FIG. 4 is a diagram of an example access network 400 including a false base station (FBS) 452 in communication with a UE 104. The access network 400 may include a legitimate cell 402 that the FBS 452 imitates. The legitimate cell may be a cell that is provided by the access network 400 and which is the source of a downlink signal to the UE 104. The legitimate cell, or legitimate base station, may refer to a cell or base station belonging to a network (e.g., a communication network such as a cellular network) that the UE 104 is trying to access for service. The access network 400 may also include additional cells 420 and 422 that represent other legitimate cells. The UE 104 may be within a coverage area of the FBS 452, the legitimate cell 402 without being in the coverages area of other cells in some examples. In contrast to the legitimate cell 402, the FBS is not associated with the access network 400 and selectively repeats a downlink signal from the legitimate cell 402 rather than being the source of the downlink signal. In other examples, the UE 104 may be within a coverage area of the FBS 452 and one or more of the additional cells 420 and 422. Security features for the air interface may be implemented, e.g., at the Packet Data Convergence Protocol (PDCP) layer through ciphering and integrity protection of data and signaling packets. For example, such security features may be applied for wireless communication based on technologies such as LTE and/or NR, etc. Signaling that originates below the PDCP layer may not be secured by the ciphering and integrity protection. In particular, physical (PHY) layer channels and signals such as the synchronization signal block (SSB), PDCCH, PUCCH, random access channel (RACH), CSI-RS, and SRS may not be protected through a security feature such as ciphering or integrity protection. Thus, an adversary (e.g., a non-authorized device that attempts to present itself as a network device) can construct the PHY layer channels and signals of an actual base station and launch various attacks against the wireless communication system. Such attacks can include selective jamming against a particular PHY channel or False Base Station (FBS) attacks.

An FBS 452 poses a security threat to wireless communication systems. The FBS 452 may be a non-authorized device that transmits synchronization signals to get the UE 104 to synchronize to the FBS 452. For example, the FBS 452 may transmit the synchronization signals (e.g., SSB) with a relatively high power so that the UE 104 will be more likely to select the FBS 452 than a legitimate cell 402. Once the UE 104 is camped on or connected to the FBS 452, the FBS 452 may be able to launch different types of attacks against the UE.

For instance, a man-in-the-middle (MITM) FBS 452 may logically sit in the middle between the UE 104 and the legitimate cell 402 in the form of a malicious repeater. The FBS 452 may act as a legitimate cell towards the UE and as a UE towards the legitimate cell. For instance, in the downlink, the FBS 452 may receive a PHY layer signal 404 from the legitimate cell 402 and generate a repeated PHY layer signal 454. However, the FBS 452 may modify the repeated PHY layer signal 454 or inject unsecure transmissions, as well as, selectively drop some (secure or unsecure) transmissions on either link direction. The UE 104 may receive and decode the repeated PHY layer signal 454. Although the UE 104 may also receive the PHY layer signal 404 from the legitimate cell 402 the UE 104 may not decode the PHY layer signal 404, because the UE 104 is synchronized to the FBS 452. As another example, in the uplink, the UE 104 may transmit an uplink signal 456 to the FBS 452. The FBS 452 may repeat the uplink signal 456 as repeated uplink signal 458, may modify the uplink signal 456, or may drop the uplink signal 456.

The dropping of transmissions by an MITM FBS may be problematic because the FBS may drop transmissions (e.g., PHY layer signal 404 that are cryptographic al secure (e.g., ciphered and integrity protected). If the MITM FBS drops a selected subset of transmissions, then the FBS 452 may go undetected for a length of time. The MITM FBS may perform an attack on Physical Downlink Control Channel (PDCCH) by leading the UE to synchronize with the FBS and then dropping PDCCH transmissions from the actual base station. The UE may not detect the attack because a dropped PDCCH transmission would be treated by the UE 104 as if there were no transmission.

As an example of an attack, the MITM FBS 452 may selectively drop all PDCCH transmissions from the legitimate base station which carry short messages indicating a public warning system (PWS) notification. Then, any UE 104 connected to the legitimate cell 402 via the FBS 452 would not receive emergency warning messages and thus be the victim of a denial of service attack. As the UE 104 is unaware of incoming PWS notifications on PDCCH, the FBS 452 could go undetected for a substantial length of time.

Several characteristics of the FBS 452 may be inferred based on an assumption that the FBS 452 tries to remain undetected. First, a MITM FBS 452 may typically be configured to use the same physical cell identity (PCI) as the legitimate cell 402. The access stratum (AS) security keys used for PDCP security are derived using, amongst other parameters, the PCI of the serving cell (i.e. the legitimate cell 402). Accordingly, in order to relay secure signaling messages unmodified and remain undetected, the FBS may use the same PCI as the legitimate cell. If a different PCI were used, the integrity protection at the UE 104 would fail and the UE 104 may detect the FBS 452.

In order to remain undetected, the MITM FBS 452 may avoid dropping all PDCCH transmissions. For example, if the FBS 452 were to drop each PDCCH transmission including those scheduled on the system information (SI) radio network temporary identifier (RNTI), the UE would not be able to decode the SI and may suspect malicious behavior or find another cell. Similarly, the FBS 452 may avoid dropping a PDCCH scheduling a signaling radio bearer (SRB) message since the dropped SRB message may lead to a radio resource control (RRC) or non-access stratum (NAS) procedure timeout. The UE 104 may reselect to a new cell in response to such timeouts, thereby avoiding the FBS.

In order to selectively drop PDCCH transmissions, the FBS 452 may decode the PHY layer signal 404 from the legitimate cell 402 and decide on a subsequent action (e.g., repeat as repeated PHY layer signal 454 or drop) depending on the nature of the PHY layer signal 404. An FBS with the ability to decode PHY layer or layer 1 transmissions (e.g. PDCCH) may be referred to as an L1 MITM FBS.

Decoding the PDCCH and deciding a subsequent action, introduces extra delay in the downlink transmission (e.g., repeated PHY layer signal 454) from the FBS 452 to the UE 104 compared to the downlink transmission (e.g., PHY layer signal 404) from the legitimate cell 402 to the UE 104. The amount of extra delay may be on the order of the PDCCH transmission duration. As one, non-limiting example, in 5G NR, the minimum and maximum allowed PDCCH durations are one and three time-domain OFDM symbols respectively. The symbol length may vary based on the numerology or sub-carrier spacing, but re known to the UE based on the configuration.

In some aspects, the base station or the UE may detect an FBS based on uplink signals from the UE that include an extra delay introduced on the downlink by the FBS. A base station for a legitimate cell may receive uplink signals from the UE either via the FBS if it is being relayed or directly from the UE. The following discussion may be applied to uplink signals that are received at the legitimate cell directly from the UE as well as to uplink signals that are relayed by an FBS.

An FBS may decode downlink physical layer transmissions to determine whether to drop the transmission to the UE and may introduce an extra delay on the downlink. A UE derives the timing for transmitting a random access preamble, e.g., a random access channel (RACH) preamble, based on the timing of the received downlink signal. If a UE synchronizes to an FBS, such as an L1 man-in-the-middle FBS, the UE would transmit the RACH preamble with an added delay introduced by the FBS. The amount of excess delay on the UE's random access preamble transmission may be on the order of the duration of the PDCCH. For example, for a 30 KHz sub-carrier spacing (SCS) and a PDCCH duration equal to one time-domain symbol, the delay may correspond to a duration of 33.3 microseconds or 10 km at the speed of light. Accordingly, the base station may observe the time of arrival of an uplink transmission from the UE, such as a random access preamble, to be delayed compared to other uplink transmissions. A network deployment may include a cell radius of no more than 5 km. Therefore, the late arrival of a RACH preamble, e.g., arriving 33.3 microseconds late (which corresponds to 10 km at the speed of light), may be used by the base station to detect the presence of an FBS.

Figure 5:
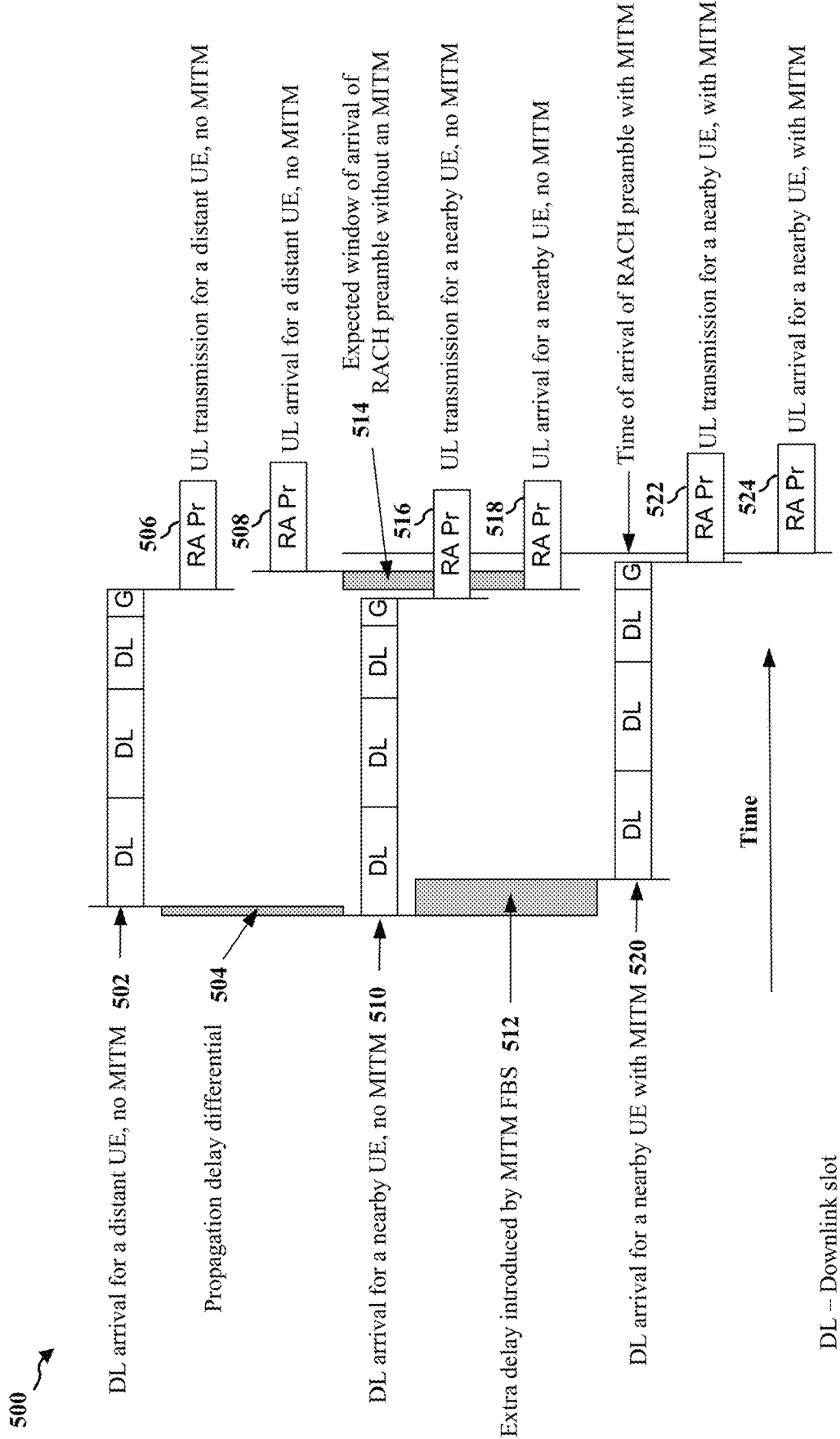
FIG. 5 is an example time diagram showing examples of delay introduced by a man-in-the-middle false base station.

FIG. 5 illustrates an example time diagram 500 that illustrates aspects an expected time window of arrival of for uplink signals, such as a random access preamble or SRS, based on a cell size and an example time of arrival of the random access preamble when a UE is synchronized to an FBS. FIG. 5 illustrates timing 502 for a downlink signal to arrive at a UE that is distant from the base station. As the UE is distant from the base station, the UE will experience a propagation delay 504 in receiving the downlink signal compared to the time 510 at which the downlink signal arrives at a UE that is near the base station. The distant UE may transmit an uplink transmission at time 506, in response to the downlink signal. The uplink signal may include a random access message, an SRS, etc. The base station may receive the uplink signal at the time 508, in which the reception time 508 of the uplink signal is spaced from the transmission time 506 due to the propagation delay based on the distance between the base station and the UE.

For a UE that is close to the base station, the downlink signal from the base station may be received at time 510 with little or no propagation delay. The UE may transmit the uplink transmission at time 516 in response to the downlink signal, and the uplink transmission may be received by the base station at time 518 with little or no propagation delay between the transmission time 516 and the reception time 518. The base station may determine an expected window of time 514 for the arrival of uplink communication. The start of the expected window of time 514 may be based on a time at which the base station expects to receive uplink communication from a UE that is close to the base station, time, e.g., 518. The end of the window may be based on a time at which the base station expects to receive uplink communication from a UE that is distant from the base station, e.g., 508. The distant UE may be based on a UE that is at the cell radius or cell edge. Thus, the expected window of time 514 may span a period between 518 and 508.

FIG. 5 also illustrates that downlink communication 520 to a UE that is synchronized with an FBS will include an extra delay 512 that is introduced by the FBS decoding the downlink transmission before repeating the transmission to the UE. The UE may respond to the base station by sending an uplink transmission at time 522, which may be received by the base station at time 524. The time 524 at which the base station receives the uplink transmission is outside of the expected window of time 514 due to the delay in the downlink transmission introduced by the FBS. The base station may detect the presence of the FBS based on the uplink transmission being received, either directly from the UE or repeated by the FBS, at a time that is beyond the expected window. For example, if the base station receives the uplink transmission after a time that includes a propagation delay for UEs at the cell edge, the base station may determine that the UE is synchronized with an FBS.

The uplink transmission may include a random access preamble, e.g., to estimate the uplink time of arrival. Aspects may also be applied to other uplink signals such as an SRS. The UE transmits SRS after applying a timing advance command, which may cause a difference in the window determined by the base station.

Figure 6:
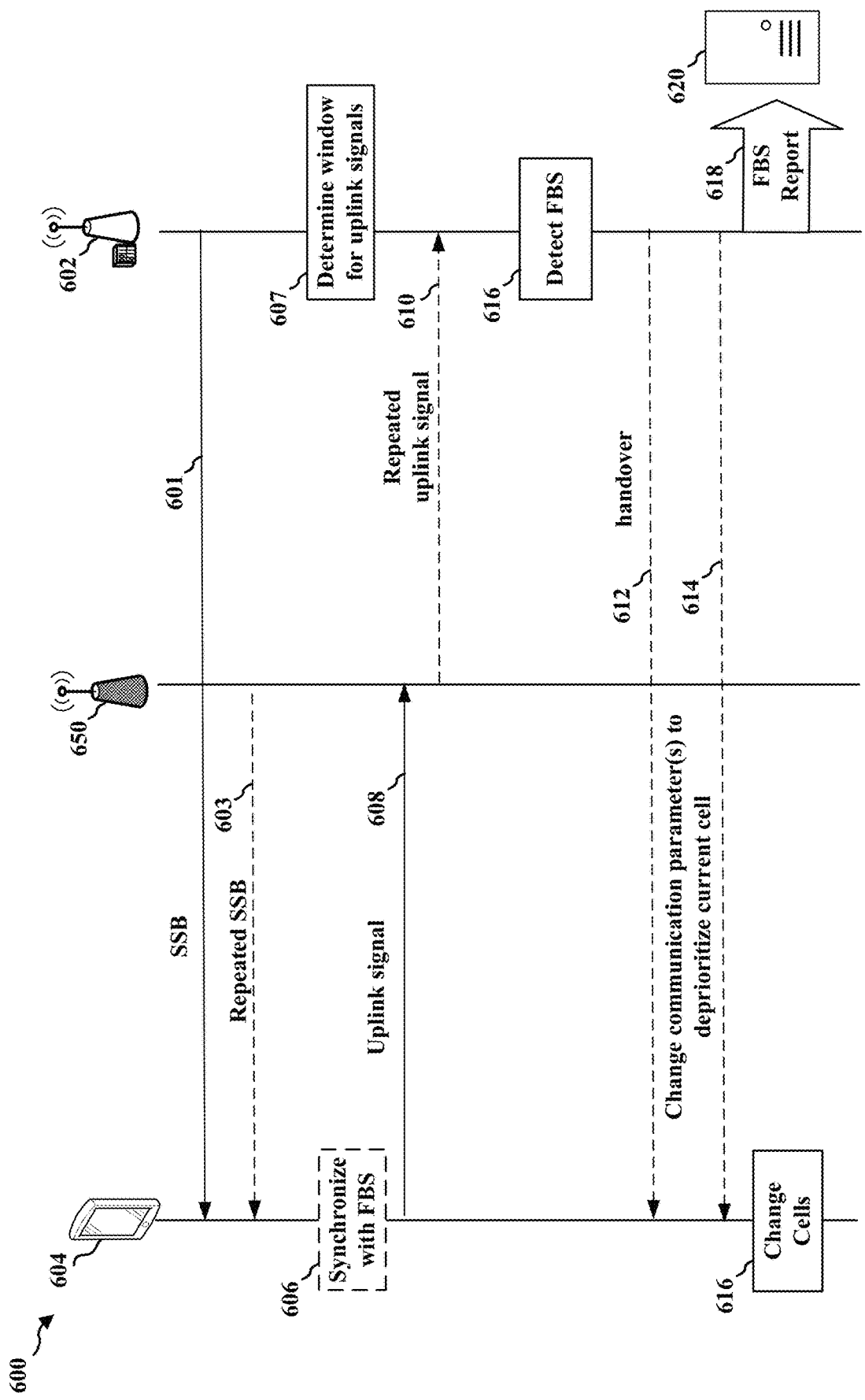
FIG. 6 illustrates an example communication flow between a base station and a UE that supports detection of a man-in-the-middle false base station based on the time of arrival of uplink transmissions.

FIG. 6 illustrates an example communication flow 600 between abase station 602 and a UE 604 that enables the base station 602 to detect the presence of an FBS 650. As discussed with respect to FIG. 4, the FBS 650 may imitate the legitimate cell of base station 602. For example, the base station 602 may broadcast an SSB 601. The SSB 601 may be received at both the FBS 650 and the UE 604. The FBS 650 may repeat the transmission of the SSB 601 as repeated SSB 603. The UE 604 may receive the repeated SSB 603 after receiving the SSB 601. The UE 604 may synchronize with one of the SSB 601 and the repeated SSB 603 based on the received signal strength. Accordingly, at block 606, the UE 604 may synchronize with the SSB 603 because the repeated SSB 603 from the FBS 650 may be received with a higher signal strength.

The FBS 650 may selectively modify or drop the downlink communications. For example, for a denial of service attack, the FBS 650 may drop downlink communications for a particular service and not transmit the repeated downlink communications for that service. The UE 604 may be unaware when the FBS 650 drops downlink communications because the UE 604 is not synchronized with the legitimate cell of base station 602.

As illustrated at 607, the base station 602 may determine a window of time for arrival of uplink signals, e.g., such as described in connection with the expected window of time 514 in FIG. 5.

The UE may transmit an uplink signal 608, such as a random access preamble, an SRS, etc. to the base station 602. The uplink signal may be repeated as the repeated uplink signal 610 from the FBS 650. The base station 602 may receive the signal 608 and/or the repeated signal 610. At 616, the base station may detect the presence of the FBS, e.g., that the UE is synchronized to the FBS 650, based on the uplink signal 608 and/or 610 being received outside of the window of time for the arrival of uplink signals that was determined at 607.

In response to detecting the FBS 650, the base station 602 may perform a mitigation operation. For example, the base station 602 may send a report 618 about the detection of the FBS to a security server 620. The base station may initiate a handover 612 of the UE 604 to a different cell, e.g., to a cell having a different PCI than the PCI used by the FBS. The base station 602 may update communication parameter (s) 614 of the UE 604 to de-prioritize the cell corresponding to the FBS, e.g., for cell selection or cell reselection by the UE 604. The handover 612 and/or the change in communication parameter(s) 614 may cause the UE to change cells, at 616. As the new cell will have a different PCI than the FBS, the UE may avoid synchronization with the FBS 650. In an aspect, the mitigation operations of the base station 602 may be applied to UEs that have not detected the FBS 650. Accordingly, the base station may mitigate the effects of the FBS 650 for multiple UEs based on the detection of the FBS, at 616.

In some aspects, the time of arrival of an uplink signal from a UE, such as a random access preamble, may be used by the base station to calculate a timing advance value for the UE. The base station may signal the timing advance to the UE. The UE may advance its uplink timing for subsequence transmissions by an amount based on the timing advance value indicated by the base station. The UE may use the timing advance signaled by the base station to detect the presence of an FBS, such as a L1 man-in-the-middle FBS.

Figure 7:
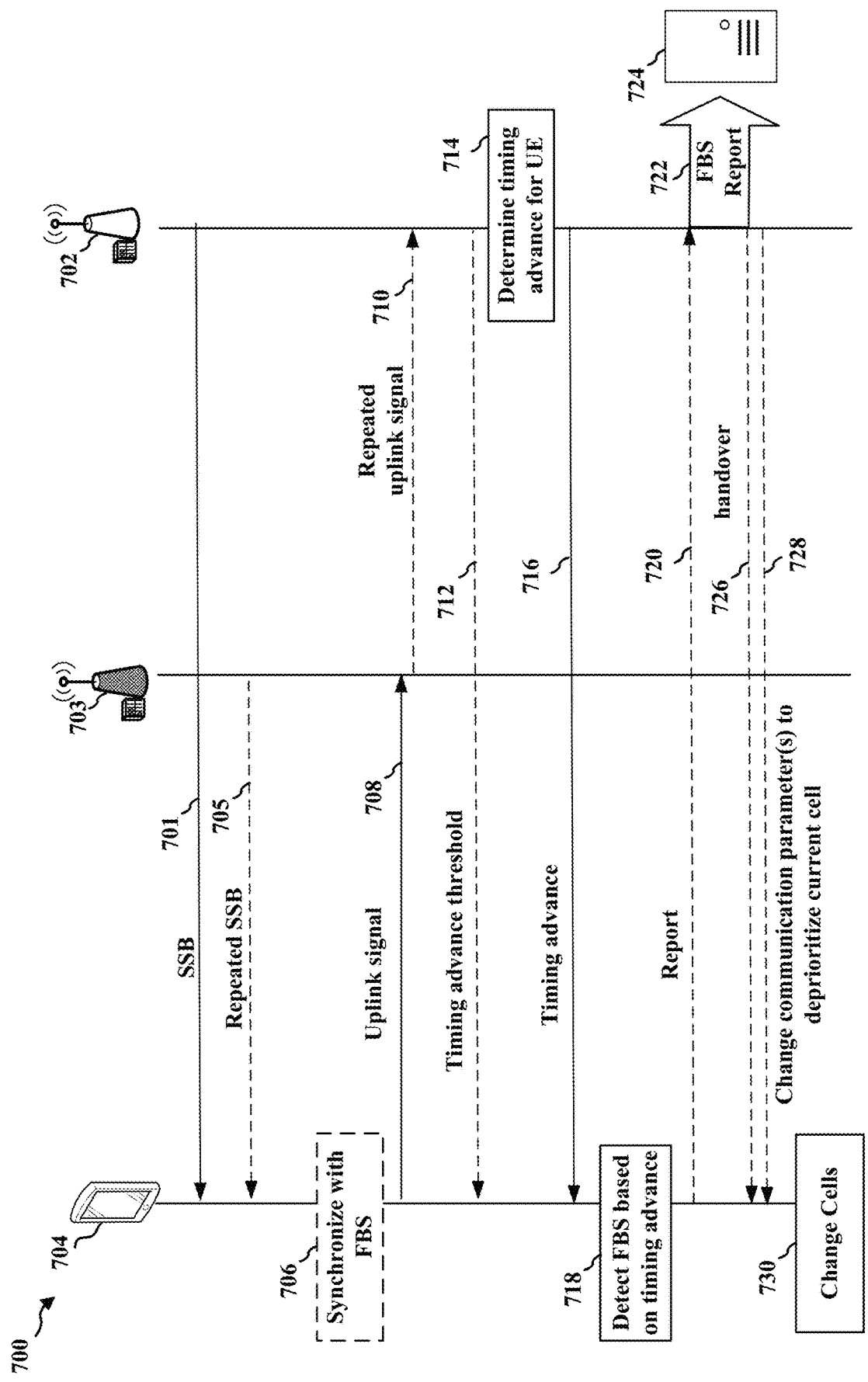
FIG. 7 illustrates an example communication flow between a base station and a UE that supports detection of a man-in-the-middle false base station based on a timing advance configured for a UE.

FIG. 7 illustrates an example communication flow 700 between abase station 702 and a UE 704 that enables the UE 704 to detect the presence of an FBS 703. As discussed with respect to FIG. 4, the FBS 703 may imitate the legitimate cell of base station 702. For example, the base station 702 may broadcast an SSB 701. The SSB 701 may be received at both the FBS 703 and the UE 704. The FBS 703 may repeat the transmission of the SSB 701 as repeated SSB 705. The UE 704 may receive the repeated SSB 705 after receiving the SSB 701. The UE 704 may synchronize with one of the SSB 701 and the repeated SSB 705 based on the received signal strength. Accordingly, at block 706, the UE 704 may synchronize with the repeated SSB 705 because the repeated SSB 705 from the FBS 703 is received with a higher signal strength at the UE 704.

As described in connection with FIG. 6, the FBS 703 may selectively modify or drop the downlink communications. For example, for a denial of service attack, the FBS 703 may drop downlink communications for a particular service and not transmit the repeated downlink communications for that service. The UE 704 may be unaware when the FBS 703 drops downlink communications because the UE 704 is not synchronized with the legitimate cell of base station 702.

As illustrated at 708, the UE may transmit an uplink transmission at 708, such as a random access preamble. The uplink transmission 708 may have the extra time delay, such as delay 512 described in connection with FIG. 5, because the uplink transmission is based on the delayed downlink transmission received from the FBS 703. The FBS 703 may transmit a repeated uplink transmission 710. At 714, the base station 702 may determine a timing advance value for the UE 704 based on the uplink transmission, either the uplink transmission 708 received directly from the UE 704 and/or the repeated uplink transmission 710. The base station signals the timing advance value 716 to the UE 704.

As illustrated at 718, the UE may detect the presence of the FBS 703 based on the timing advance value 716 from the base station 702. For example, if the timing advance value exceeds a threshold, the UE may determine that the UE has synchronized with the FBS 703. In some examples, the base station 702 may determine a timing advance threshold associated with detection of an FBS by the UE 604 and may signal the timing advance threshold 712 to the UE. The threshold may be more than a timing advance that is expected for a UE that is at or near the cell edge. In some aspects, the timing advance threshold 712 may be broadcast in system information. In some aspects, the timing advance threshold 712 may be transmitted to the UE 704 in UE specific signaling.

In response to detecting the FBS, at 718, the UE may send a report 720 of the FBS to the base station 702. The report 720 may be transmitted as a higher layer control message (e.g., RRC message) that is protected by PDCP ciphering and integrity protection. The base station 702 may forward the report 720 as a report 722 to a security server 724. The security server 724 may provide information to network administrators or operators to take further action. Additionally, or alternatively, the UE 704 may change cells and/or the base station may facilitate a cell change for the UE. For example, at 730, the UE 704 may autonomously select a different cell (e.g., by ignoring or disregarding the repeated SSB 705 from the FBS 703). Accordingly, the UE 704 may access the network via a different frequency, a different frequency band, or a different radio access technology (RAT) (e.g., using LTE instead of 5G NR). The base station may facilitate a change of cells, for example, by initiating a handover 726 of the UE 704 to a different cell. As another example, the base station 702 may update one or more communication parameters 728 to de-prioritize the cells corresponding to the FBS 703 for cell selection/re-selection at the UE 704. In an aspect, the mitigation operations of the base station 702 may be applied to UEs that have not detected the FBS 703. Accordingly, the base station may mitigate the effects of the FBS 703 for multiple UEs based on the report 720 from the UE 704.

Figure 8:
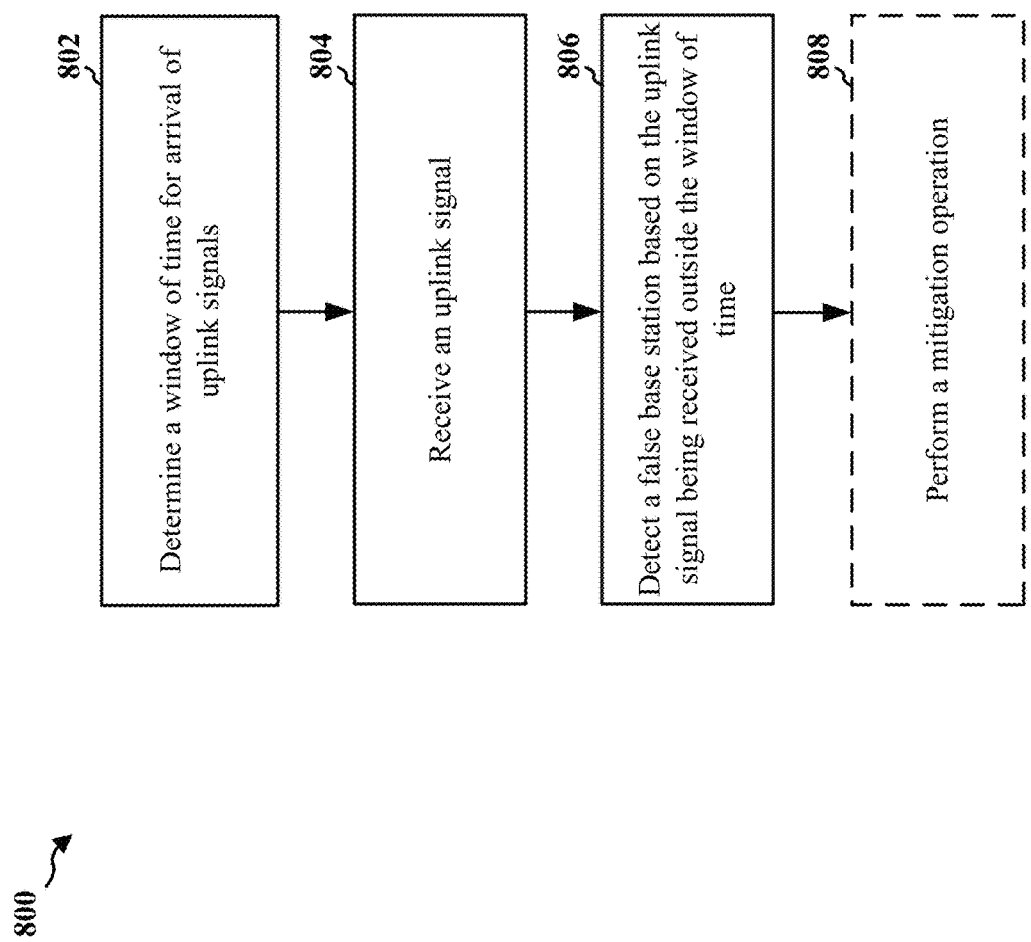
FIG. 8 is a flowchart of a method of wireless communication at a base station.

FIG. 8 is a flowchart 800 of a method of wireless communication. The method may be performed by a base station or a component of a base station (e.g., the base station 102, 180, 310, 602, 702; legitimate cell 402; the apparatus 1002 or 1102, which may include the memory 376 and which may be the entire base station 310 or a component of the base station 310, such as the TX processor 316, the RX processor 370, and/or the controller/processor 375). The method may enable a base station to detect an FBS, such as a man-in-the-middle L1 FBS.

At 802, the base station determines a window of time for arrival of uplink signals. The window of time includes a start based on a first expected time of arrival for a first uplink signal from a first location within a cell associated with the base station and an end based on a second expected time of arrival for a second uplink signal from a second location within the cell. The determination may be performed, e.g., by the window component 1008 of the apparatus 1002 or 1102. FIG. 5 illustrates example aspects of a window of time 514 during which the base station may expect to receive uplink signals from a UE. FIG. 6 illustrates a base station 602 determining a window of time, at 607. The first location may be at a first distance that is closer to the base station than a second distance of the second location. For example, the start of the window of time may be a time of arrival that expected for a UE that is close to the base station, and the end of the window of time may be based on a UE that is distant from the base station. For example, the second distance may correspond to the cell radius. The first distance may correspond to a location of the base station, such as a distance of 0 from the base station for the cell.

At 804, the base station receives an uplink signal. The reception may be performed, e.g., by the reception component 1004 of the apparatus 1002 or 1102. In some aspects, the uplink signal may comprise a random access signal, such as a random access preamble. In some aspects, the uplink signal may comprise an SRS. FIGS. 5, 6, and 7 illustrate examples of a base station receiving an uplink signal from a UE.

At 806, the base station detects an FBS based on the uplink signal being received outside of the window of time for the arrival of uplink signals. The detection may be performed, e.g., by the detection component 1010 of the apparatus 1002 or 1102. FIG. 6 illustrates an example of a base station 602 detecting an FBS based on the time of arrival of an uplink signal. As the FBS decodes the physical layer downlink signal, e.g., in order to determine whether to drop the downlink signal, the delay of the repeated signal is greater than would be expected due to propagation and/or a legitimate repeater. Example aspects of the delay introduced by an FBS are described in connection with FIGS. 4 and 5. The timing of the uplink signal from the UE is based on the delayed downlink signal from the FBS, and therefore, also includes a delay. Accordingly, the base station may determine that uplink signals that are received outside the expected window of arrival time for uplink signals indicate the presence of an FBS.

At 808, the base station may perform a mitigation operation in response to detecting the FBS. The mitigation operation may be performed, e.g., by the mitigation component 1012 of the apparatus 1002 or 1102. FIGS. 6 and 7 illustrate examples of mitigation operation in response to the detection of an FB S. In some aspects, the mitigation operation may include handing over the UE to a different cell. In some aspects, the mitigation operation may include updating one or more communication parameters for cell selection or cell reselection to de-prioritize a cell corresponding to the FBS.

Figure 9:
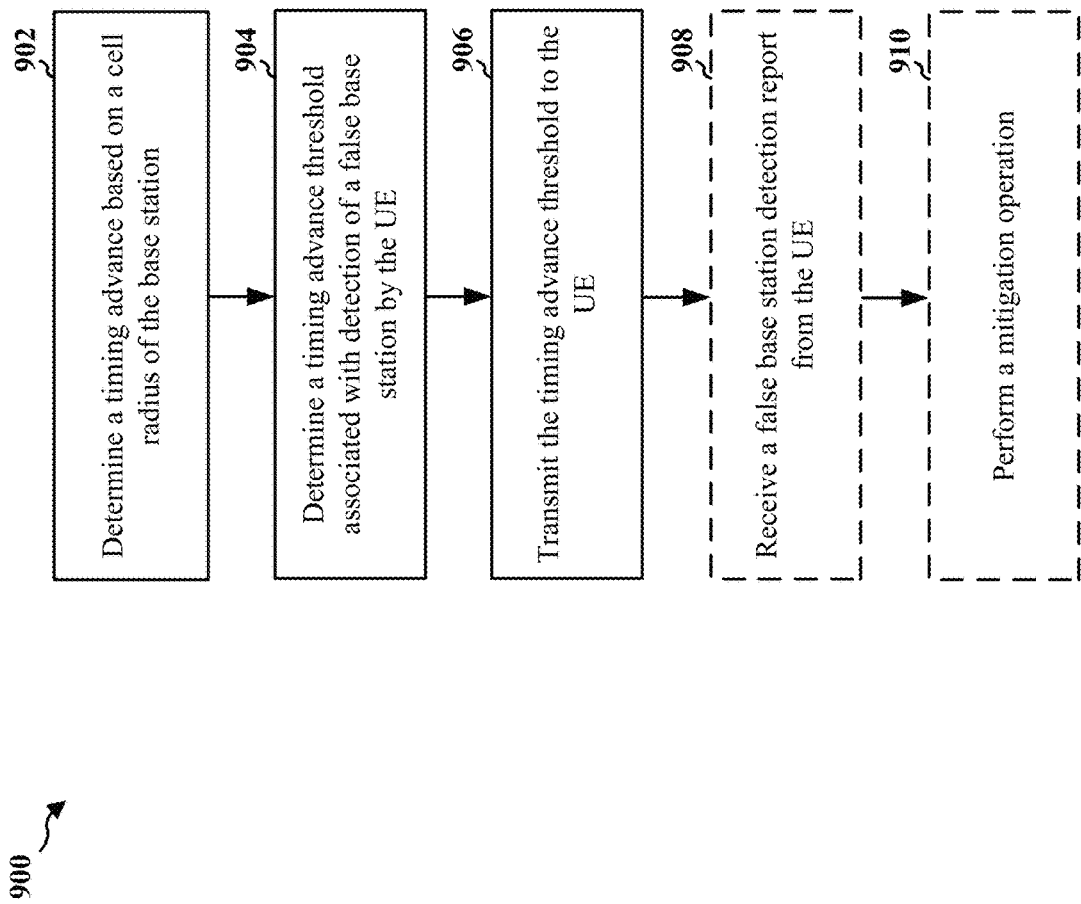
FIG. 9 is a flowchart of a method of wireless communication at a base station.

FIG. 9 is a flowchart 900 of a method of wireless communication. The method may be performed by a base station or a component of a base station (e.g., the base station 102, 180, 310, 602, 702; legitimate cell 402; the apparatus 1002, 1102, which may include the memory 376 and which may be the entire base station 310 or a component of the base station 310, such as the TX processor 316, the RX processor 370, and/or the controller/processor 375). The method may enable a base station to detect an FBS, such as a man-in-the-middle L1 FBS.

At 902, the base station determines a timing advance based on a cell radius of the base station, e.g., an expected timing advance for a UE at the cell edge or near the cell edge of the base station. The base station may determine the timing advance based on a cell size for the base station. The determination of the timing advance may be further based on a time difference between uplink and downlink slot boundaries. As an example, the base station may determine the threshold based on Timing Advance=2*r/c+abs(T_UL_DL), where r=cell radius, c=speed of light, T_UL_DL=time difference between uplink and downlink slot boundaries, and abs is an absolute value function. The parameter T_UL_DL may be dependent on a base station capability, e.g. a time for the base station to switch from an uplink slot to a downlink slot in a TDD system. The determination may be performed, e.g., by the timing advance component 1014 of the apparatus 1002 or 1102. The timing advance may be based on the amount of time that it takes for a prior uplink signal from the UE, e.g., a random access preamble, to reach the base station. The uplink signal may be received directly from the UE and/or may include a repeated uplink signal that is received from an FBS. FIG. 7 illustrates an example of a base station 702 determining a timing advance for a UE 704.

At 904, the base station determines a timing advance threshold associated with detection of an FBS by the UE, the timing advance threshold being longer than the timing advance based on the cell radius of the base station, which is determined at 902. The determination may be performed, e.g., by the threshold component 1016 of the apparatus 1002 or 1102. The base station may determine the timing advance threshold based on a cell radius for the base station, e.g., to be longer that a timing advance for a UE at the cell radius of the base station. For example, the base station may determine the timing advance threshold to be larger than a timing advance that the base station expects for a UE that is at or near the cell radius. The base station may first determine an expected timing advance threshold for a UE that is at or near the cell radius of the base station, e.g., at 902. Then, the base station may select or determine a timing advance threshold that is longer than the timing advance for a UE that is at or near the cell radius of the base station. The timing advance being larger than the timing advance determined at 902 may indicate the presence of an FBS, e.g., as described in connection with FIGS. 4 and 5. FIG. 5 illustrates example aspects for the expected timing of downlink and uplink signals without the presence of an FBS. Because the FBS decodes the physical layer downlink signal, e.g., in order to determine whether to drop the signal, the delay of the repeated signal is greater than would be expected due to propagation and/or a legitimate repeater. Example aspects of the delay introduced by an FBS are described in connection with FIGS. 4 and 5. The uplink signals from the UE are based on the delayed downlink signal from the FBS, and therefore, also include a delay. Accordingly, a timing advance that is more than expected for a UE at the cell radius may be used by the UE to detect the presence of an FBS.

At 906, the base station transmits the timing advance threshold to the UE for the detection of the FBS by the UE. FIG. 7 illustrates an example of a base station 702 providing a timing advance threshold 712 to a UE 704. The transmission may be performed, e.g., by the transmission component 1006 of the apparatus 1002 or 1102. In some aspects, the base station may transmit the timing advance threshold in system information. In some aspects, the base station may transmit the timing advance threshold in UE specific signaling.

As illustrated at 908, the base station may receive a false base station detection report from UE. For example, the UE may detect the presence of the FBS, such as described in connection with 1206 in FIG. 12, using the timing advance threshold provided by the base station, at 906. The reception of the false base station detection report may be performed, e.g., by the reception component 1004 and/or the detection component 1010 of the apparatus 1002 or 1102. FIG. 7 illustrates an example of a base station 702 receiving a report 720 from a UE 704.

At 910, the base station may perform a mitigation operation in response to receiving the report. The mitigation operation may be performed, e.g., by the mitigation component 1012 of the apparatus 1002 or 1102. In some aspects, the mitigation operation may include handing over the UE to a different cell. In some aspects, the mitigation operation may include updating one or more communication parameters for cell selection or cell reselection to de-prioritize a cell corresponding to the FBS. FIG. 6 and FIG. 7 illustrate examples of mitigation operations that may be performed in response to the detection of an FBS.

Figure 10:
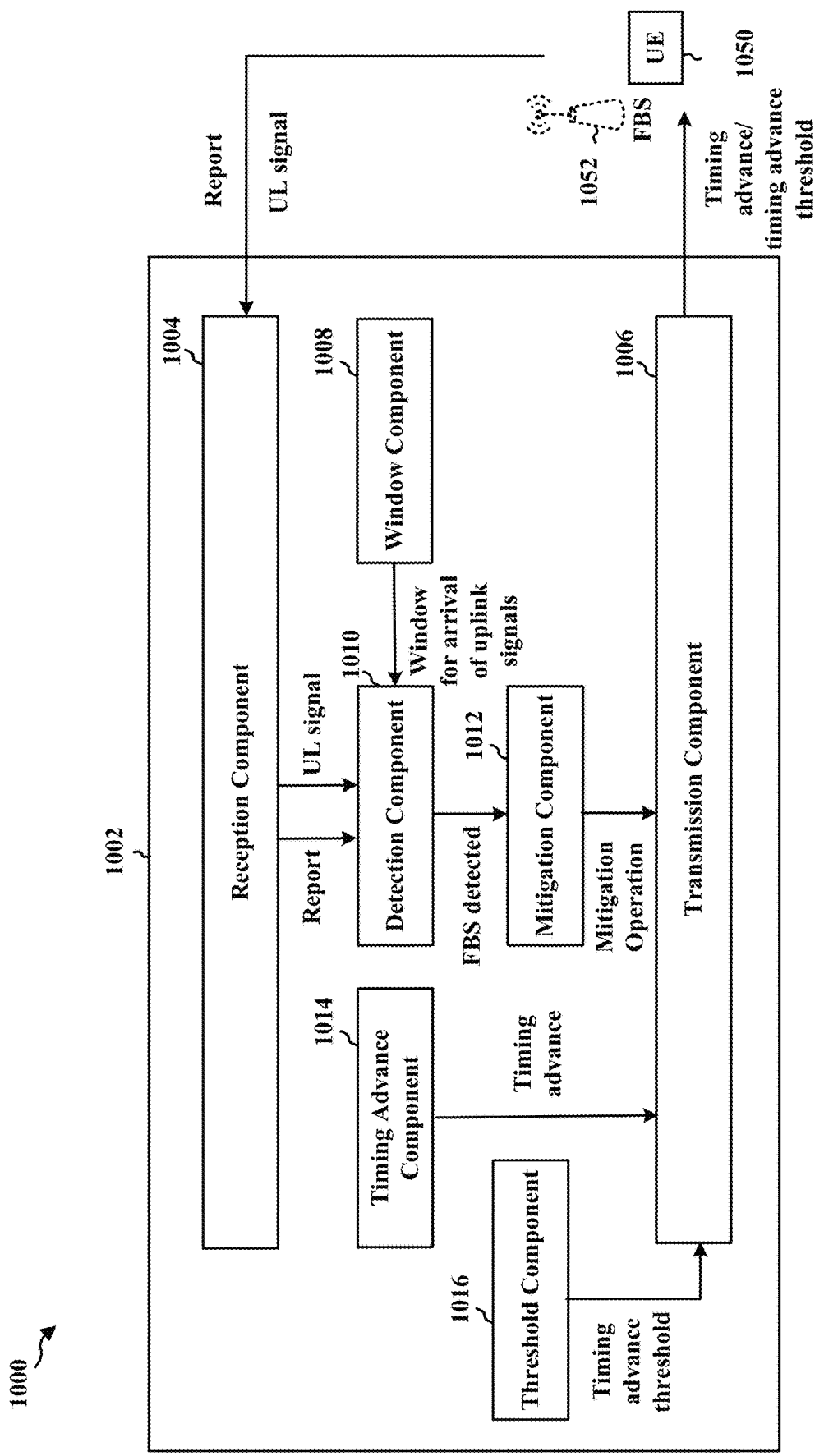
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a base station or a component of a base station. The apparatus includes a reception component 1004 that receives uplink communication and a transmission component 1006 that transmits downlink communication. The apparatus 1002 may include a window component 1008 configured to determine a window of time for arrival of uplink signals, the window of time including a start based on a first expected time of arrival for a first uplink signal from a first UE and an end based on a second expected time of arrival for a second uplink signal from a second UE, e.g., as described in connection with 802 in FIG. 8. The reception component 1004 may be configured to receive an uplink signal, e.g., as described in connection with 804 in FIG. 8. The apparatus 1002 may include a detection component 1010 configured to detect an FBS (e.g., 1052) based on the uplink signal being received outside of the window of time for the arrival of uplink signals, e.g., as described in connection with 806 in FIG. 8. The apparatus 1002 may include a mitigation component 1012 configured to perform a mitigation operation in response to detecting the FBS, e.g., as described in connection with 808 in FIG. 8. The apparatus 1002 may include a timing advance component 1014 configured to determine a timing advance based on a cell radius of the base station, e.g., as described in connection with 902 in FIG. 9. The apparatus 1002 may include a threshold component 1016 configured to determine a timing advance threshold associated with detection of an FBS 1052 by the UE 1050, the timing advance threshold being larger than the timing advance based on the cell radius of the base station, e.g., as described in connection with 904 in FIG. 4. The transmission component 1006 may be configured to transmit the timing advance threshold to the UE 1050 for the detection of the FBS 1052 by the UE 1050, e.g., as described in connection with 906 in FIG. 9. The reception component 1004 may be configured to receive a false base station detection report from UE 1050, e.g., as described in connection with 908 in FIG. 9. The mitigation component 1012 may be configured to perform a mitigation operation in response to receiving the report, e.g., as described in connection with 910 in FIG. 9.

The apparatus may include additional components that perform each of the blocks of the algorithm in the aforementioned flowcharts of FIG. 8 or 9. As such, each block in the aforementioned flowcharts of FIG. 8 or 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
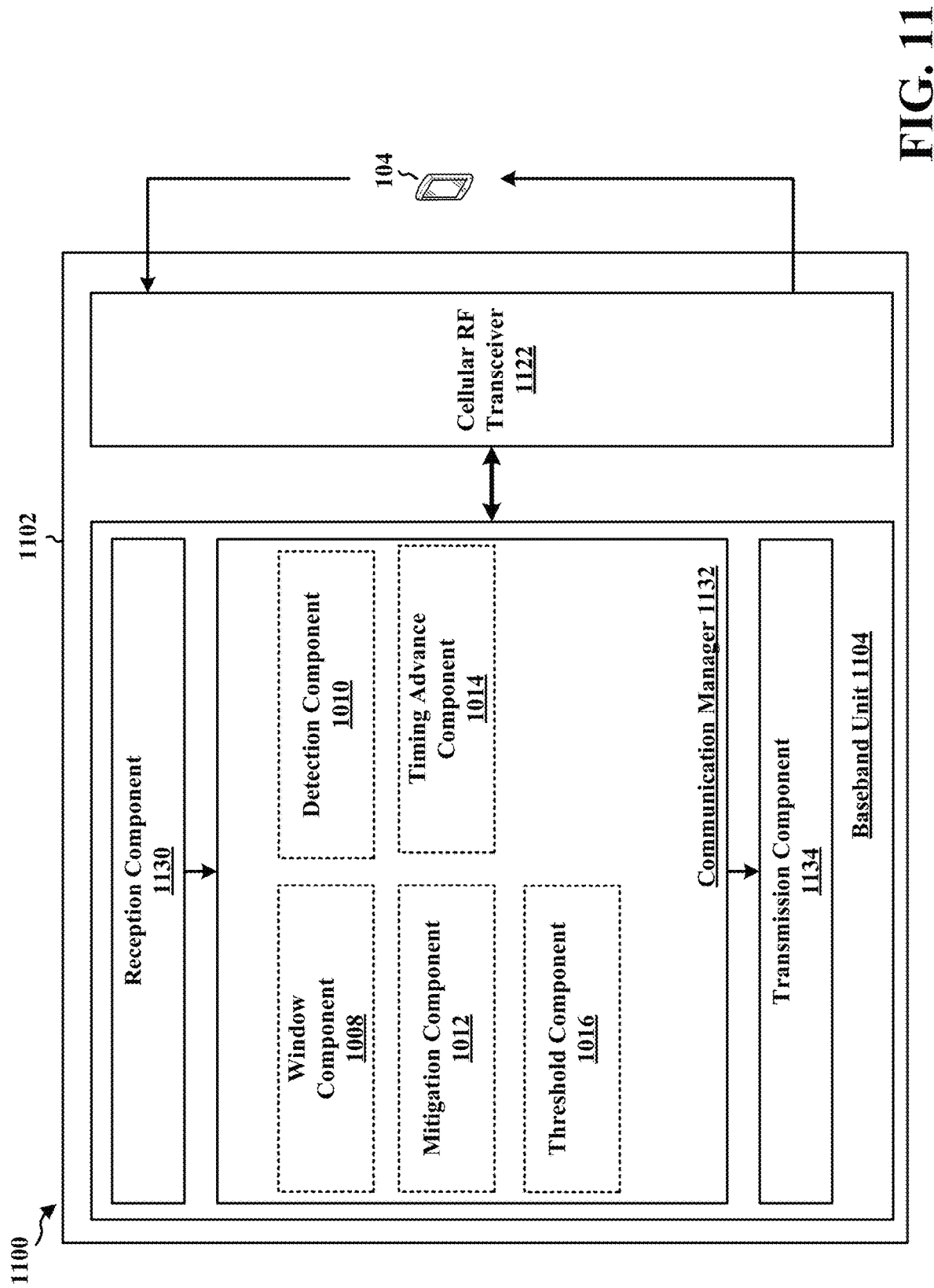
FIG. 11 is a diagram illustrating an example of a hardware implementation for an apparatus employing a processing system.

FIG. 11 is a diagram 1100 illustrating an example of a hardware implementation for an apparatus 1102. The apparatus 1102 is a BS and includes a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 that includes a window component 1008, a detection component 1010, a mitigation component 1012, a timing advance component 1014, and a threshold component 1016 that are configured to perform the aspects described in connection with FIGS. 8, 9, and/or FIG. 10. The apparatus may include additional components that perform each of the blocks of the algorithm in the aforementioned flowchart of FIG. 8 or 9. As such, each block in the aforementioned flowchart of FIG. 8 or 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002 or 1102 for wireless communication includes means for determining a window of time for arrival of uplink signals, where the window of time includes a start based on a first expected time of arrival for a first uplink signal from a first UE and an end based on a second expected time of arrival for a second uplink signal from a second UE. The apparatus may include means for receiving an uplink signal and means for detecting an FBS based on the uplink signal being received from the UE outside of the window of time for the arrival of uplink signals. The apparatus may include means for performing a mitigation operation in response to detecting the FBS. The apparatus may include means for indicating a timing advance for uplink communication to a UE. The apparatus includes means for determining a timing advance threshold associated with detection of an FBS by the UE and means for transmitting the timing advance threshold to the UE for the detection of the FBS by the UE. The apparatus may include means for receiving a false base station detection report from UE. The apparatus may include means for performing a mitigation operation in response to receiving the false base station detection report from UE. The aforementioned means may be one or more of the aforementioned components of the apparatus 1002 or 1102 configured to perform the functions recited by the aforementioned means. As described supra, the apparatus 1002 or 1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 12:
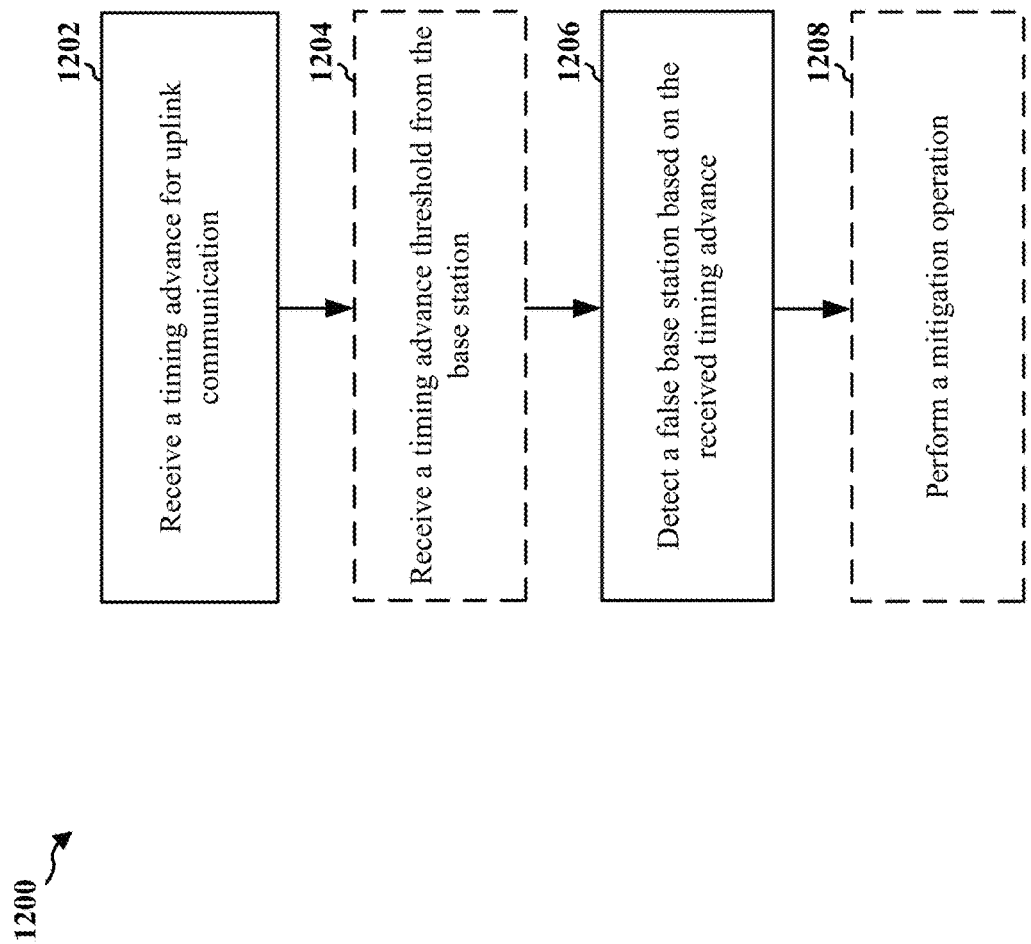
FIG. 12 is a flowchart of a method of wireless communication at a UE.

FIG. 12 is a flowchart 1200 of a method of wireless communication. The method may be performed by a UE or a component of a UE (e.g., the UE 104, 604, 704; the apparatus 1302, 1402, which may include the memory 360 and which may be the entire UE 350 or a component of the UE 350, such as the TX processor 368, the RX processor 356, and/or the controller/processor 359). The method may enable a UE to detect an FBS, such as a man-in-the-middle L1 FBS.

At 1202, the UE receives an indication of a timing advance for uplink communication from a base station. The reception may be performed, e.g., by the reception component 1304 and/or the timing advance component 1308 of the apparatus 1302 or 1402. The timing advance for the UE may be determined by the base station based on a time at which the base station receives uplink communication from the UE and may reduce a delay in reception of uplink communication at the base station. FIG. 7 illustrates an example of a UE 704 receiving a timing advance 716 from a base station 702.

At 1206, the UE detects an FBS based on the timing advance received from the base station. The detection may be performed, e.g., by the detection component 1310 of the apparatus 1302 or 1402. For example, if the timing advance that is received from the base station is greater than an expected amount, the UE may determine that communication with the base station is being delayed by an FBS, such as a L1 man-in-the middle FBS. The UE may detect the FBS based on the timing advance meeting a timing advance threshold, such as being greater than a timing advance threshold. FIG. 7 illustrates an example 718 of the UE 704 detecting the presence of an FBS, at 718. Example aspects of the delay introduced by an FBS are described in connection with FIGS. 4 and 5.

At 1204, the UE may receive the timing advance threshold from the base station. The reception may be performed, e.g., by the reception component and/or the threshold component 1312 of the apparatus 1302 or 1402. The UE may receive the timing advance threshold in system information. The UE may receive the timing advance threshold in UE specific signaling. The timing advance threshold may be based on a cell radius for the base station, such as considering a time delay for the base station to receive communication from a UE at the cell radius At 1208, the UE may perform a mitigation operation in response to detecting the FBS. The mitigation operation may be performed, e.g., by the mitigation component 1314 of the apparatus 1302 or 1402. As the UE may detect that the UE is synchronized with the FBS and is receiving communication from a legitimate base station that is relayed by the FBS, the mitigation operation may help the UE to avoid communication with the FBS and/or to communicate directly with a legitimate base station. In some aspects, the mitigation operation may include reporting the detected FBS to a security server of a communication network. For example, the transmission component 1306 of the apparatus 1302 or 1402 may transmit the security report to the network. The network may then perform an action to assist the UE in avoiding the FBS and communicating with a legitimate base station. In some aspects, the mitigation operation may include updating one or more communication parameters. The UE may update the one or more communication parameters to access a communication network using a different cell, a different frequency, a different band, or a different RAT. FIGS. 6 and 7 illustrate examples of mitigation operations in response to the detection of an FBS.

Figure 13:
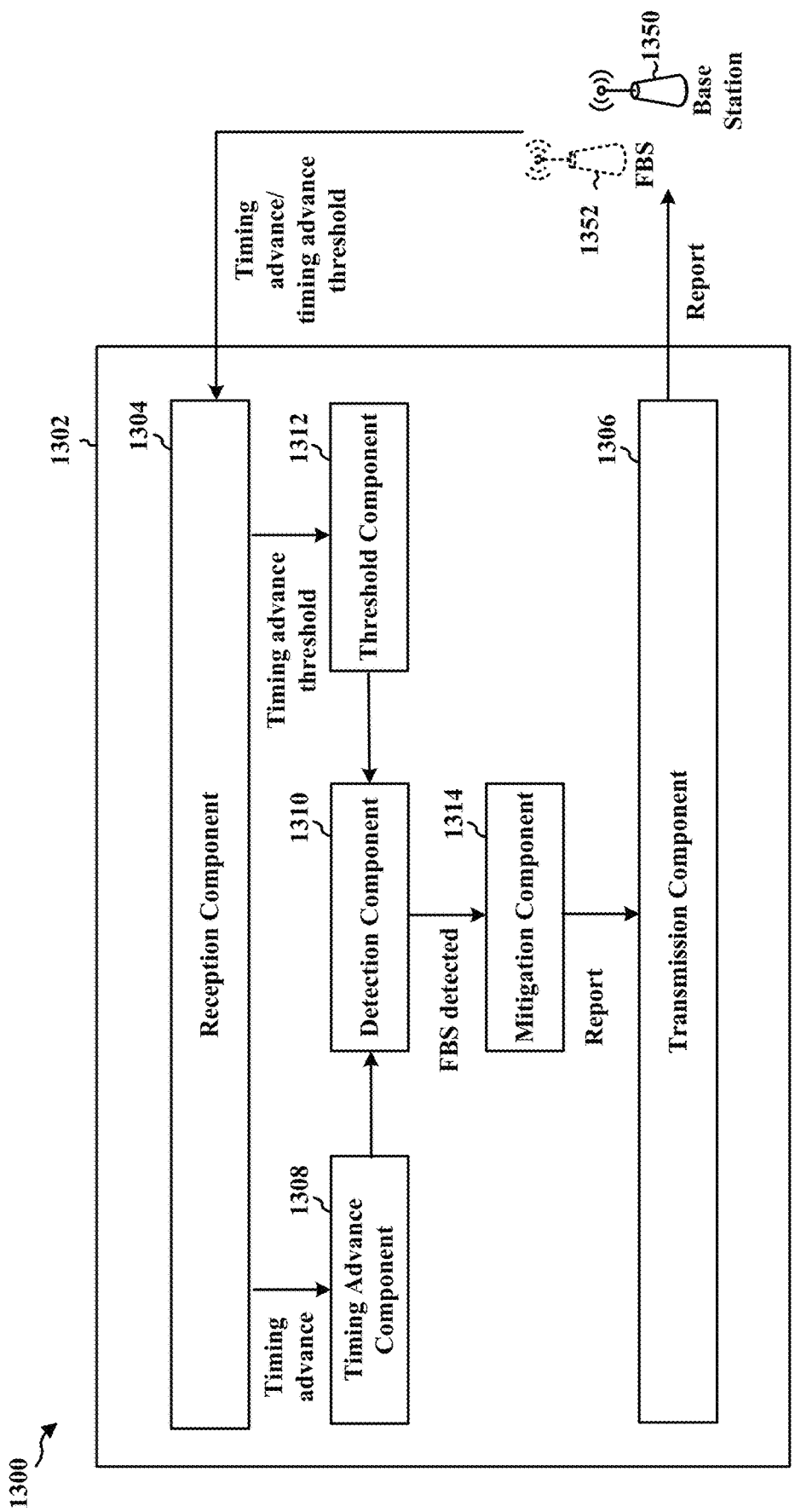
FIG. 13 is a conceptual data flow diagram illustrating the data flow between different means/components in an example apparatus.

FIG. 13 is a conceptual data flow diagram 1300 illustrating the data flow between different means/components in an example apparatus 1302. The apparatus may be a UE or a component of a UE. The apparatus includes a reception component 1304 configured to receive downlink communication and a transmission component 1306 configured to transmit uplink communication. The apparatus includes a timing advance component 1308 configured to receive an indication of a timing advance for uplink communication from a base station 1350, e.g., as described in connection with 1202 in FIG. 12. The apparatus may include threshold component 1312 configured to receive the timing advance threshold from the base station, e.g., as described in connection with 1204 in FIG. 12. The apparatus 1302 includes a detection component 1310 configured to detect an FBS (e.g., FBS 1352 that is relaying the communication from the base station 1350 to the apparatus 1302) based on the timing advance received from the base station 1350, e.g., such as described in connection with 1206 in FIG. 12. The apparatus may include a mitigation component 1314 configured to perform a mitigation operation in response to detecting the FBS, e.g., as described in connection with 1208 in FIG. 12.

The apparatus may include additional components that perform each of the blocks of the algorithm in the aforementioned flowchart of FIG. 12. As such, each block in the aforementioned flowcharts of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
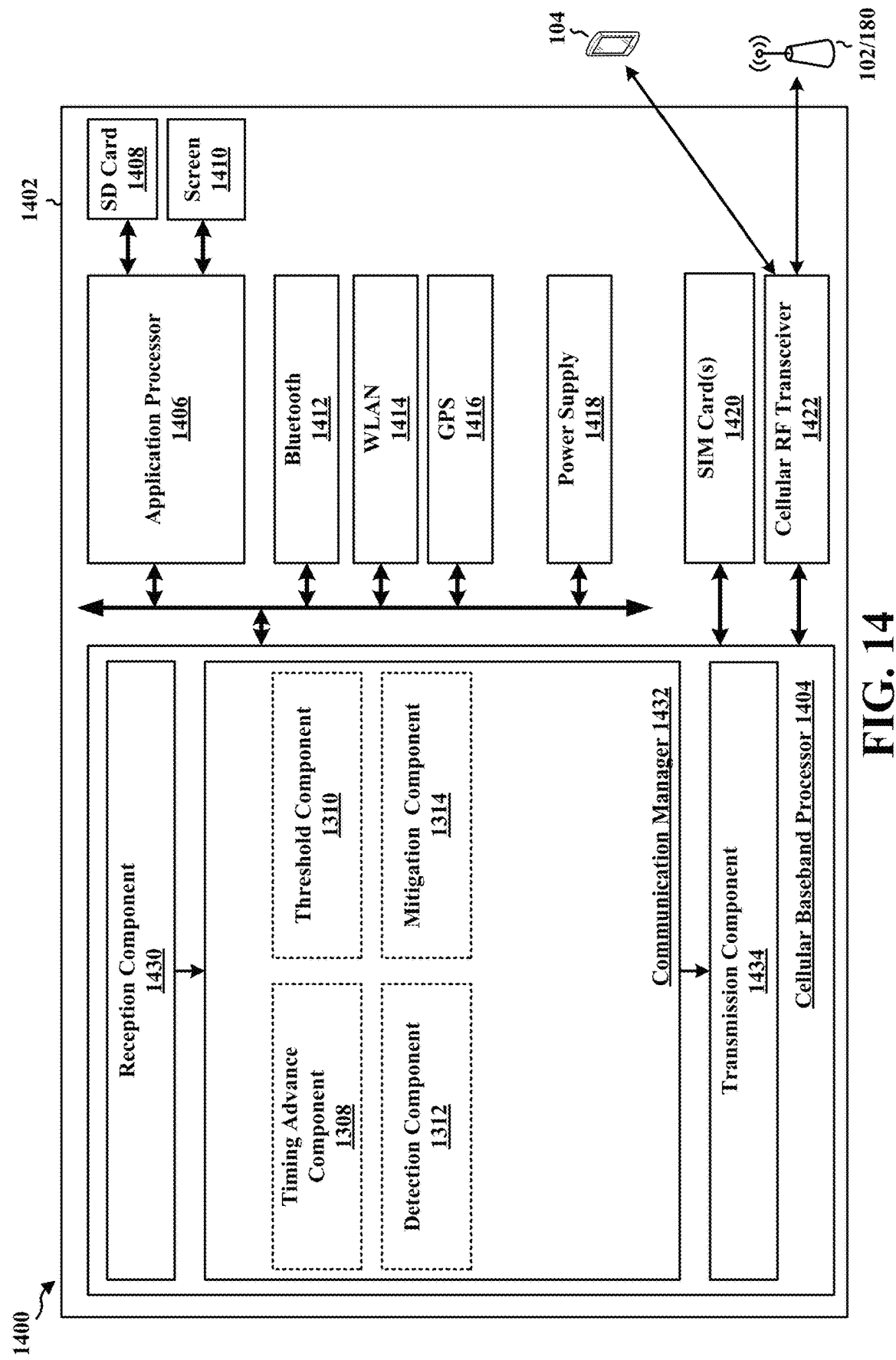
FIG. 14 is a diagram illustrating an example of a hardware implementation for an apparatus employing a processing system.

FIG. 14 is a diagram 1400 illustrating an example of a hardware implementation for an apparatus 1402. The apparatus 1402 is a UE and includes a cellular baseband processor 1404 (also referred to as a modem) coupled to a cellular RF transceiver 1422 and one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager includes a timing advance component 1308, a threshold component 1312, a detection component 1310, a mitigation component 1314 configured to perform the aspects described in connection with FIGS. 12 and/or 13. The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302 or 1402 for wireless communication includes means for receiving an indication of a timing advance for uplink communication from a base station and means for detecting an FBS based on the timing advance received from the base station. The apparatus may include means for receiving the timing advance threshold from the base station. The apparatus may include means for performing a mitigation operation in response to detecting the FBS. The aforementioned means may be one or more of the aforementioned components of the apparatus 1302 or 1402 configured to perform the functions recited by the aforementioned means. As described supra, the apparatus 1302 or 1402 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following aspects are illustrative only and may be combined with other aspects or teaching described herein, without limitation.

Aspect 1 is a method of wireless communication at a base station, comprising: determining a window of time for arrival of uplink signals, wherein the window of time includes a start based on a first expected time of arrival for a first uplink signal from a first location within a cell associated with the base station and an end based on a second expected time of arrival for a second uplink signal from a second location within the cell; receiving an uplink signal; and detecting a FBS based on the uplink signal being received outside of the window of time for the arrival of the uplink signals.

In aspect 2, the method of aspect 1 further includes that the uplink signal comprises a random access signal.

In aspect 3, the method of aspect 1 or aspect 2 further includes that the uplink signal comprises a SRS.

In aspect 4, the method of any of aspects 1-3 further includes that the first location is at a first distance from the base station and the second location is at a second distance from the base station, and the first distance is shorter than the second distance.

In aspect 5, the method of any of aspects 1-4 further includes that the second distance corresponds to a cell radius.

In aspect 6, the method of any of aspects 1-5 further includes that the first distance corresponds to a location of the base station.

In aspect 7, the method of any of aspects 1-6 further includes performing a mitigation operation for at least one UE in response to detecting the FBS.

In aspect 8, the method of aspect 7 further includes that the mitigation operation includes handing over the at least one UE to a different cell.

In aspect 9, the method of aspect 7 or 8 further includes that the mitigation operation includes updating one or more communication parameters for cell selection or cell reselection to de-prioritize a cell corresponding to the FBS.

Aspect 10 is a device or apparatus including one or more processors and one or more memories in electronic communication with the one or more processors storing instructions executable by the one or more processors to cause the device to implement a method as in any of aspects 1-9.

Aspect 11 is a system or apparatus including means for implementing a method or realizing an apparatus as in any of aspects 1-9.

Aspect 12 is a non-transitory computer readable medium storing instructions executable by one or more processors to cause the one or more processors to implement a method as in any of aspects 1-9.

Aspect 13 is a method of wireless communication at a base station, comprising:
determining a timing advance based on a cell radius of the base station; determining a timing advance threshold associated with detection of a FBS by a UE, the timing advance threshold being longer than the timing advance based on the cell radius of the base station; and transmitting the timing advance threshold to the UE for the detection of the FBS by the UE.

In aspect 14, the method of aspect 13 further includes that the base station determines the timing advance based on the cell radius and a time for the base station to switch from an uplink slot to a downlink slot in a TDD system.

In aspect 15, the method of aspect 13 or aspect 14 further includes that the base station transmits the timing advance threshold in system information.

In aspect 16, the method of aspect 13 or aspect 14 further includes that the base station transmits the timing advance threshold in UE specific signaling.

In aspect 17, the method of any of aspects 13-16 further includes that the base station determines the timing advance threshold based on the cell radius for the base station.

Aspect 18 is a device or apparatus including one or more processors and one or more memories in electronic communication with the one or more processors storing instructions executable by the one or more processors to cause the device to implement a method as in any of aspects 13-17.

Aspect 19 is a system or apparatus including means for implementing a method or realizing an apparatus as in any of aspects 13-17.

Aspect 20 is a non-transitory computer readable medium storing instructions executable by one or more processors to cause the one or more processors to implement a method as in any of aspects 13-17.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:
   determining a timing advance based on a cell radius of the base station;
   determining a timing advance threshold associated with detection of a false base station (FBS) by a user equipment (UE), the timing advance threshold being longer than the timing advance based on the cell radius of the base station; and
   transmitting the timing advance threshold to the UE for the detection of the FBS by the UE.

2. The method of claim 1, wherein the base station determines the timing advance based on the cell radius and a time for the base station to switch from an uplink slot to a downlink slot in a time division duplex (TDD) system.

3. The method of claim 1, wherein the base station transmits the timing advance threshold in system information.

4. The method of claim 1, wherein the base station transmits the timing advance threshold in UE specific signaling.

5. The method of claim 1, wherein the base station determines the timing advance threshold based on the cell radius for the base station.

6. An apparatus for wireless communication at a base station, comprising:
   a memory; and
   at least one processor coupled to the memory and configured to:
     determine a timing advance based on a cell radius of the base station;
     determine a timing advance threshold associated with detection of a false base station (FBS) by a user equipment (UE), the timing advance threshold being longer than the timing advance based on the cell radius of the base station;
     and transmit the timing advance threshold to the UE for the detection of the FBS by the UE.

7. The apparatus of claim 6, wherein the at least one processor is configured to determine the timing advance based on the cell radius and a time for the base station to switch from an uplink slot to a downlink slot in a time division duplex (TDD) system.

8. The apparatus of claim 6, wherein the at least one processor is configured to transmit the timing advance threshold in system information.

9. The apparatus of claim 6, wherein the at least one processor is configured to transmit the timing advance threshold in UE specific signaling.

10. The apparatus of claim 6, wherein the apparatus determines the timing advance threshold based on the cell radius for the apparatus.

11. The apparatus of claim 6, wherein the apparatus determines the timing advance threshold based on a time difference between uplink and downlink slot boundaries.

12. The apparatus of claim 6, wherein the apparatus determines the timing advance threshold based on a prior uplink signal.

13. The apparatus of claim 6, wherein the at least one processor is configured to receive a FBS detection report from UE.

14. The apparatus of claim 13, wherein the at least one processor is configured to perform a mitigation operation in response to receiving the FBS detection report.

15. The apparatus of claim 14, wherein the mitigation operation comprises handing over the UE to a different cell or updating one or more communication parameters for cell selection or cell reselection to de-prioritize a cell corresponding to the FBS.

* * * * *